Figure 1:
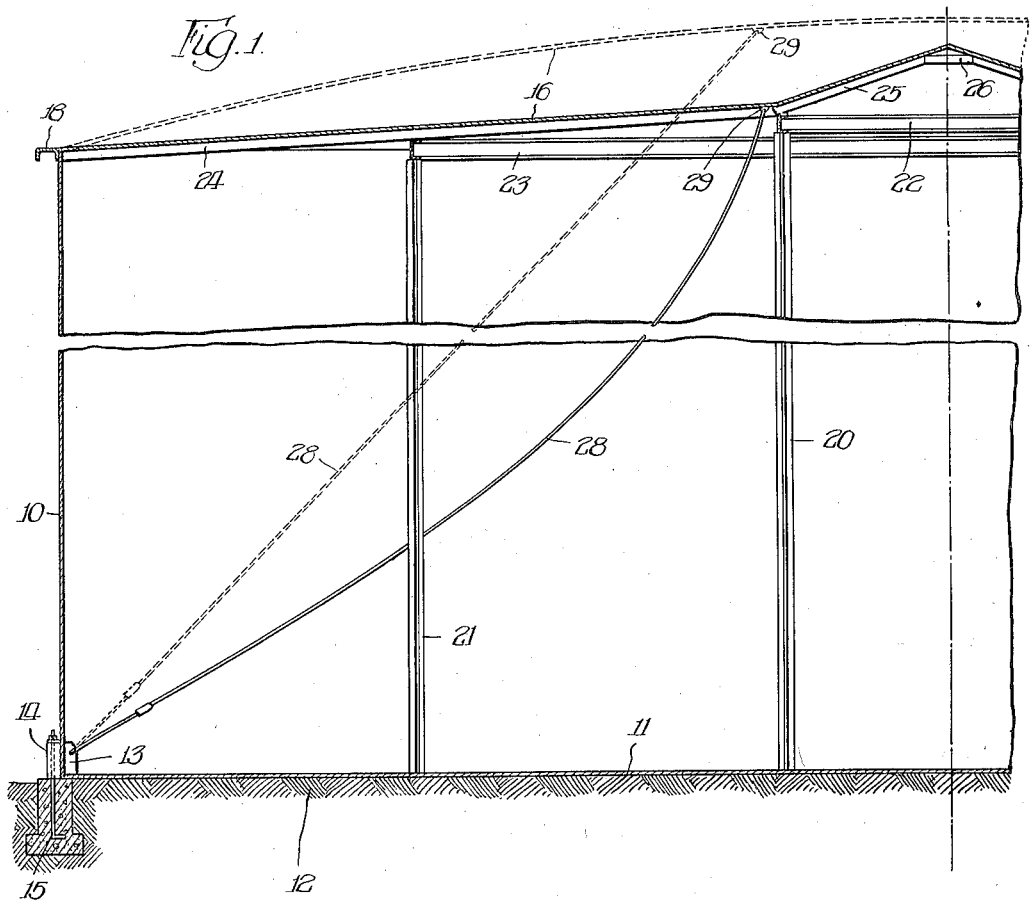

April 19, 1938.  L. A. WILKIN  2,114,513
COMBINED BREATHER AND PRESSURE ROOF
Filed July 28, 1937

Inventor:
Lester A. Wilkin,
By Wilkinson, Huxley, Byron & Knight
Attys.

Patented Apr. 19, 1938

2,114,513

UNITED STATES PATENT OFFICE 2,114,513

COMBINED BREATHER AND PRESSURE ROOF

Lester A. Wilkin, East Chicago, Ind., assignor to Graver Tank & Mfg. Co., Inc., Catasauqua, Pa., a corporation of Delaware Application July 28, 1937, Serial No. 156,095

5 Claims. (Cl. 220—1)

The invention relates to storage tanks for storing gases and volatile liquids and has for its primary object to provide a storage tank having a combined breather and pressure roof.

The invention contemplates that the roof will be supported in deflated position by supporting means within the tank and a further object resides in the provision of supporting means which will give to the flexible metal roof a shape to insure proper drainage while the roof remains deflated. The deflated position of the present breather roof, which is entirely above the horizontal plane coinciding with the top of the tank, has the further advantage in that the tank can be completely filled with liquid. This is not possible with breather roofs which assume a concave shape when deflated.

A further object is to provide a combination breather and pressure roof for storage tanks which will materially increase the vapor space of the tank by flexing from a deflated to an expanded position and which in said latter position will withstand considerable pressure as a result of means within the tank which tie the roof to anchorage members at the base of the tank walls. The means for tying the roof to the anchorage members may comprise chains or cables which will transmit a part of the pressure on the expanded roof to the said anchorage members.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 2:
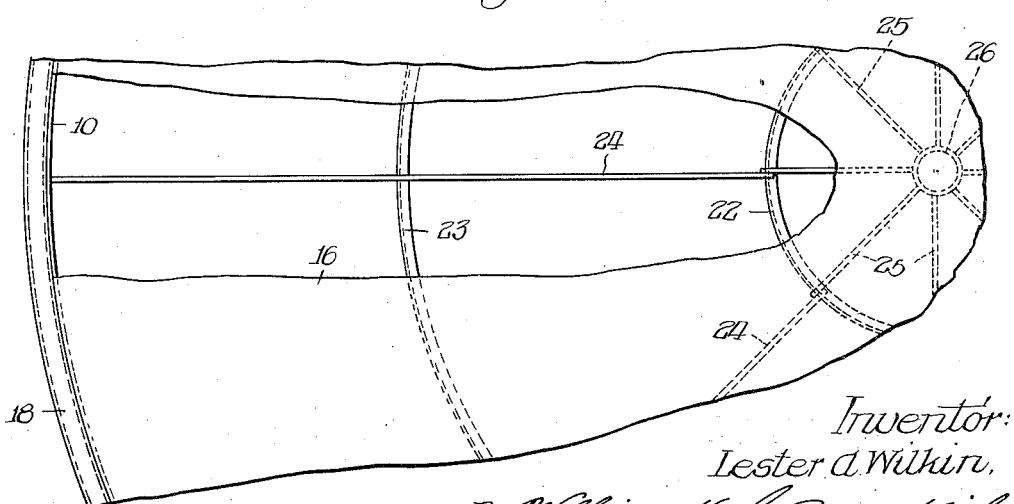

Figure 1 is a sectional view taken through a storage tank equipped with the combined breather and pressure roof according to the present invention; and Figure 2 is a fragmentary top plan view of the tank shown in Figure 1 to illustrate the radial arrangement of the supporting means for the roof.

Referring to the drawing which illustrates one embodiment of the invention, the reference numeral 10 indicates the cylindrical shell of a storage tank, which shell may consist of a plurality of metal plates suitably secured to each other as by welding or riveting and which is sufficiently rigid to be self-supporting without the aid of bracing or other reinforcing structure. The rigid bottom 11 of the present tank is formed of metal of approximately the same thickness as the side walls and may also consist of a plurality of metal plates welded or riveted together. The bottom is supported directly upon the ground 12 which has been previously tamped and levelled for receiving the bottom plate of the tank. On the interior of the tank brackets 13 are located at the base of the side walls 10 and which are suitably secured as by welding to said side walls and to the base member 11. On the exterior of the tank at the base of the side walls, brackets 14 are suitably welded, which brackets have secured thereto the depending anchorage rods 15. The cylindrical shell of the tank is anchored to the earth by the said anchorage rods which are imbedded in a concrete ring having a center diameter approximately the same as that of the cylindrical shell and which coincides with said shell.

The top 16 of the present tank comprises a limber metal sheet which likewise may consist of a plurality of metal plates suitably secured together as by riveting or welding. The top is joined at its periphery to the upper edge of the cylindrical shell 10. At this point the exterior of the metal shell is reinforced by a circular girder 18 which has the effect of stiffening the shell to resist the inward pressure on the same caused by the roof 16 when in expanded position. The roof of the tank may more properly be termed an imperforate diaphragm of metal which will buckle to some extent when in deflated position. The roof member thus provides sufficient metal to permit the same to move upwardly into an inflated position as a result of vapor pressure within the tank.

The position and shape of the present roof when deflated is determined by supporting means located within the tank and which may comprise a plurality of uprights 20 and 21 which rest on the bottom member 11 of the tank and support the structural members 22 and 23, respectively. The beams 24, which are radially disposed, are supported at their inner end by the channel 22 and at their outer end by the cylindrical shell of the tank. Intermediately thereof the beams rest on the channel 23. The beams 24 form one slope of the present roof, whereas, the beams 25 form the other and steeper slope of the roof. These latter beams are suitably secured as by welding to the beams 24 and are joined at their inner ends to the circular member 26, located at the apex of the cone. The two slopes which characterize the present roof will vary of course, depending on the diameter of the tank, on the pressure to which the roof is to be subjected, and on the thickness of the roof plates. In the present embodiment the beams 24 have a slope of approximately three degrees and the beams 25 a slope of approximately twenty degrees. In all instances the two slopes will be so proportioned as to equal in length the arc of the expanded position of the roof. Generally in larger tanks the radius of the expanded roof will be greater than the diameter of the cylindrical shell 10 of the tank.

When the vapor pressure within the tank is less than the weight of the roof, the roof will rest on and be supported by the supporting means within the tank. In this position the roof assumes a shape which insures proper drainage. The central cone formed by the members 25 will drain onto the peripheral slope formed by the members 24 which have sufficient angularity to shed water and therefore the present roof can not be placed under abnormal strain by failure of rain water to drain therfrom when deflated. The present roof is at all times located entirely above the horizontal plane comprising the top of the tank and therefore it is possible to fill the tank even with the top. This is not possible in storage tanks equipped with a breather roof having a concave shape when deflated. The movement of the present roof from a deflated to an expanded position materially increases the vapor space of the tank and in effect permits the tank to breathe. The vapors expand and contract but do not escape from the tank.

For large tanks and for high pressure small diameter tanks the invention provides means through which a portion of the pressure on the roof is transmitted to the anchorage members for the cylindrical shell. As a result the roof of these tanks can withstand a relatively high vapor pressure. The said means may consist of chains or cables 28 connecting with the roof 16 at points 29 spaced around and adjacent the channel 22 and having connection at their other end with brackets 13. If found necessary, a stiffening member may be secured to the roof to reinforce the same at those points where the cables 28 connect with the roof. Since the roof comprises a limber sheet of metal the pressure on the same would have to be maintained at a minimum were it not for the cables 28, which effectively transmit to the anchorage means a portion of the pressure on the roof. Therefore, a breather roof embodying the invention is able to withstand a considerably higher vapor pressure. The rods 15 comprising said anchorage means are imbedded in concrete and the uplifting forces are adequately counteracted. The cables or chains also cause the roof to expand evenly and further assist in returning the roof to its deflated position.

When the present tank is used to store non-volatile liquids, the roof will act as an ordinary cone roof. In fact, the slope of the outer periphery of the present roof approximates that of a standard cone roof. An important feature of the present roof resides in the fact that a vapor space always exists above the liquid. Since vapor is a poor conductor of heat the said vapor acts as a blanket above the liquid, insulating the same and preventing rapid temperature changes. It is understood that the present roof will be equipped with venting mechanism which may be of conventional design. This is merely a safety measure in order to allow the escape of vapor from the tank in the event the pressure on the breather roof should exceed the safe limit for said roof.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. In a gas or liquid storage tank, the combination with side wall portions, of a metallic roof connected to said side wall portions by a gas tight joint and constructed so that it is capable of moving between deflated and expanded positions for varying the vapor space within the tank, supporting means within the tank for supporting the roof in deflated position when the vapor pressure is less than the weight of the roof, the major part of said supporting means projecting above a horizontal plane formed by the top of the side wall portions and supporting the roof above said horizontal plane, and said roof when supported by said means including an inclined peripheral portion and a central cone-shaped portion, the inclination of said central portion being greater than that of said peripheral portion.

2. A tank for storing gases and volatile liquids provided with a breather roof adapted to have movement between deflated and expanded positions for varying the vapor space within the tank, supporting structure within the tank for supporting said breather roof when in deflated position, the major portion of said structure projecting above a horizontal plane formed by the top of the cylindrical shell of the tank and supporting the roof above said horizontal plane, said structure giving to said roof when supported thereby a shape simulating a cone characterized however by a double slope, the central portion of the roof having a greater inclination than the peripheral portion and forming with said peripheral portion an exterior angle which is less than 180 degrees.

3. A tank for storing gases and volatile liquids provided with a roof connected to the side walls of the tank and capable of moving from a deflated position to an expanded position in which latter position the arc formed by said roof has a radius greater than the diameter of the tank, supporting means within the tank for supporting the roof in deflated position, said means giving to said roof when supported thereby a shape simulating a cone characterized however by a double slope and including an inclined peripheral portion and a cone-shaped central portion, the central portion of the roof having a greater inclination than the peripheral portion and forming with said peripheral portion an exterior angle which is less than 180 degrees.

4. A tank for storing gases and volatile liquids provided with a roof connected to the side walls of the tank and capable of moving between deflated and expanded positions, supporting means within the tank for supporting the roof in deflated position, the major portion of said means projecting above a horizontal plane formed by the top of the side walls of the tank and supporting the roof above said horizontal plane, said supporting means being constructed to give to said roof when supported thereby a shape simulating a cone characterized however by a double slope, the central portion of the roof having a greater inclination than the peripheral portion and forming with this peripheral portion an exterior angle which is less than 180 degrees, and means within the tank connecting said roof to the base of the tank, said means limiting movement of the roof in an expanding direction whereby a portion of the pressure on said roof when fully expanded will be transmitted by said means to the base of the tank.

5. A tank for storing gases and volatile liquids provided with a roof connected to the side walls of the tank and capable of moving between deflated and expanded positions, supporting means within the tank for supporting the roof in deflated positions, said supporting means being constructed to give to said roof when supported thereby a shape simulating a cone characterized however by a double slope, the central portion of the roof having a greater inclination than the peripheral portion and forming with said peripheral portion an exterior angle which is less than 180 degrees, means within the tank connecting said roof to the side walls at the base of the tank to limit movement of the roof in an expanding direction, and anchorage members for anchoring the side walls of the tank to the earth, whereby a portion of the pressure on the roof when expanded will be transmitted by said means to said anchorage members.

LESTER A. WILKIN.